(12) United States Patent
Katoh et al.

(10) Patent No.: US 7,263,059 B2
(45) Date of Patent: Aug. 28, 2007

(54) HIGH-FREQUENCY RECEIVING APPARATUS HAVING WIDE FREQUENCY PULL-IN RANGE

(75) Inventors: Nobuhiro Katoh, Nara (JP); Yuki Yoneu, Yao (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 1004 days.

(21) Appl. No.: 10/315,977

(22) Filed: Dec. 11, 2002

(65) Prior Publication Data

US 2003/0137929 A1    Jul. 24, 2003

(30) Foreign Application Priority Data

Jan. 22, 2002    (JP)    ............... 2002-013110

(51) Int. Cl.
*H04J 11/00*    (2006.01)
*H04L 27/00*    (2006.01)

(52) U.S. Cl. ...................... 370/206; 375/326

(58) Field of Classification Search ........ 370/203–208; 329/304, 306, 341; 375/324, 329, 334
See application file for complete search history.

(56) References Cited

U.S. PATENT DOCUMENTS

| | | | |
|---|---|---|---|
| 5,440,268 A * | 8/1995 | Taga et al. ............. | 329/308 |
| 5,483,686 A * | 1/1996 | Saka et al. ............. | 455/182.2 |
| 5,912,930 A * | 6/1999 | Iwasaki .................. | 375/329 |
| 6,191,649 B1 * | 2/2001 | Sugita et al. ........... | 329/304 |
| 6,456,672 B1 * | 9/2002 | Uchiki et al. ........... | 375/344 |
| 6,492,914 B2 * | 12/2002 | Katoh .................... | 341/50 |
| 2002/0071502 A1 * | 6/2002 | Chan et al. ............. | 375/326 |

FOREIGN PATENT DOCUMENTS

| | | |
|---|---|---|
| JP | 01-206760 A | 8/1989 |
| JP | 02-100421 A | 4/1990 |
| JP | 06-069972 A | 3/1994 |
| JP | 08-116254 A | 5/1996 |
| JP | 10-341263 A | 12/1998 |
| JP | 11-355370 A | 12/1999 |
| JP | 2000-209293 A | 7/2000 |

* cited by examiner

*Primary Examiner*—Chau Nguyen
*Assistant Examiner*—Nittaya Juntima
(74) *Attorney, Agent, or Firm*—Birch, Stewart, Kolasch & Birch, LLP

(57) ABSTRACT

A high-frequency receiving apparatus includes a phase pull-in circuit controlling an oscillator so as to eliminate a phase difference, a frequency pull-in circuit controlling the oscillator so as to eliminate a frequency difference, a frequency shift circuit shifting an oscillation frequency of the oscillator by a prescribed frequency when the frequency difference is large, and a control signal generation circuit controlling those circuits according to an algorithm selected from a plurality of algorithms corresponding to, for example, a symbol rate. Therefore, a wide range of frequency can rapidly be pulled regardless of the level of the symbol rate.

7 Claims, 11 Drawing Sheets

HIGH-FREQUENCY RECEIVING APPARATUS HAVING WIDE FREQUENCY PULL-IN RANGE

BACKGROUND OF THE INVENTION

1. Field of the Invention

The present invention relates to a high-frequency receiving apparatus and, more specifically, to a high-frequency receiving apparatus receiving and demodulating a high-frequency signal modulated with a digital signal.

2. Description of the Background Art

FIG. 12 is a circuit block diagram of a main portion of a conventional high-frequency receiving apparatus. In FIG. 12, this high-frequency receiving apparatus includes a signal input terminal 31, frequency conversion circuits 32, 33, a 90° phase shifter 34, a local oscillator 35, a PLL circuit 36, a reference signal generation circuit 37, low-pass filters 38, 39, and analog-digital converters 40, 41.

A digitally-modulated high-frequency signal φ31 is input to signal input terminal 31. High-frequency signal φ31 is fed to frequency converters 32, 33. In reference signal generation circuit 37, a reference signal having a prescribed frequency is generated. Local oscillator 35 generates a local oscillation signal φ35 having the same frequency as a center frequency of high-frequency signal φ31. PLL circuit 36 controls a phase of local oscillation signal φ35 based on the reference signal generated in reference signal generation circuit 37.

Along with feeding local oscillation signal φ35 from local oscillator 35 to frequency converter 32, 90° phase shifter 34 generates a signal φ34 by shifting the phase of local oscillation signal φ35 by 90°, and feeds to frequency converter 33. Frequency converters 32, 33 mix high-frequency signal φ31 with respective local oscillation signals φ35, φ34 from 90° phase shifter 34, and generate baseband signals φ32, φ33.

Low-pass filters 38, 39 remove high-frequency components, interference signals from an adjacent channel, and noise from respective baseband signals φ32, φ33 generated at frequency converters 32, 33. Analog-digital converters 40, 41 convert analog signals respectively passed through low-pass filters 38, 39 to digital signals for demodulation processing in a subsequent demodulation unit.

The high-frequency receiving apparatus further includes a complex multiplier 42, digital low-pass filters 43, 44, a phase pull-in circuit 45, a frequency pull-in circuit 46, an adder 47, a numerically controlled oscillator (NCO) 48, and data converters 49, 50. Complex multiplier 42 performs the same operation in a baseband as that of frequency converters 32, 33 which operate in an intermediate frequency band, and converts frequencies of output signals of analog-digital converters 40, 41. Digital low-pass filters 43, 44 remove high-frequency components from output signals of complex multiplier 42. Digital low-pass filters 43, 44 are designed to obtain so-called roll-off properties when combined with a filter characteristic of a sending end. Output signals of digital low-pass filters 43, 44 are fed to a subsequent circuit as an I signal and a Q signal, which are respective demodulation results, and are also fed to phase pull-in circuit 45 and frequency pull-in circuit 46.

Phase pull-in circuit 45 detects phase differences between output signals of digital low-pass filters 43, 44 and a target phase, and feeds a signal having a level corresponding to the phase differences to adder 47. Frequency pull-in circuit 46 detects frequency differences between output signals of digital low-pass filters 43, 44 and a target frequency, and feeds a signal having a level corresponding to the frequency differences to adder 47.

Adder 47 feeds output signals of phase pull-in circuit 45 and frequency pull-in circuit 46 to a control terminal of numerically controlled oscillator 48. Numerically controlled oscillator 48 is formed with a cumulative adder circuit which does not inhibit an overflow, and is set to an oscillation state at a frequency corresponding to a signal value fed to the control terminal. An output signal of numerically controlled oscillator 48 is fed to data converters 49, 50. Data converters 49, 50 respectively generate a sine signal and a cosine signal in response to the output signal of numerically controlled oscillator 48, and feed the results to complex multiplier 42.

Therefore, a digital PLL circuit is formed with complex multiplier 42, digital low-pass filters 43, 44, phase pull-in circuit 45, frequency pull-in circuit 46, adder 47, numerically controlled oscillator 48, and data converters 49, 50, and an oscillation frequency of numerically controlled oscillator 48 is controlled such that, both of the phase difference and frequency difference become zero.

In the conventional high-frequency receiving apparatus, however, because the frequency pull-in range depends on a symbol rate of high-frequency signal φ31, frequency can be pulled in a relatively wide range when the symbol rate is high, but the pull-in range becomes narrower when the symbol rate is lower.

In a QPSK demodulation system, for example, the frequency difference is calculated from a phase difference between symbols. Therefore, assuming that the symbol rate of high-frequency signal φ31 is fs, the range in which the frequency difference can be obtained is within ±fs/8. Thus, the frequency pull-in range becomes narrower when symbol rate fs is lower.

SUMMARY OF THE INVENTION

Therefore, a main object of the present invention is to provide a high-frequency receiving apparatus with a wide frequency pull-in range and a rapid pull-in operation.

A high-frequency receiving apparatus according to the present invention includes an analog-digital converter converting an analog signal as a received signal to a digital signal, an oscillator having a controllable oscillation frequency and outputting a carrier regeneration signal, a multiplier multiplying a digital signal generated by the analog-digital converter and a carrier regeneration signal generated by the oscillator, a phase pull-in circuit controlling the oscillator to adjust a phase of an output signal of the multiplier to a predetermined target phase, a frequency pull-in circuit controlling the oscillator to adjust a frequency of an output signal of the multiplier to a predetermined target frequency, a frequency shift circuit controlling the oscillator to make a frequency of an output signal of the multiplier shift by a predetermined frequency, and a control circuit controlling the phase pull-in circuit, the frequency pull-in circuit and the frequency shift circuit. The frequency pull-in range thus becomes wider because the pull-in operation is performed by shifting the frequency by the frequency shift circuit even when the frequency difference exceeds the pull-in range of the frequency pull-in circuit. In addition, when the frequency difference is smaller, the pull-in operation becomes more rapid because the pull-in operation is performed by the phase pull-in circuit and the frequency pull-in circuit.

The control circuit preferably has a plurality of algorithms to pull a phase and a frequency of an output signal of the multiplier into the target phase and the target frequency respectively, and controls the phase pull-in circuit, the frequency pull-in circuit and the frequency shift circuit according to an algorithm selected from the plurality of algorithms. In this situation, the frequency pull-in region can further be made wider and the pull-in operation can further be made rapid by performing the pull-in operation with an algorithm corresponding to the symbol rate of the high-frequency signal.

In addition, it is preferable that the predetermined frequency in the frequency shift circuit is variable. In this situation, the frequency pull-in operation can become more rapid by setting a shift width to an optimum value corresponding to the symbol rate.

In addition, it is preferable that whether to shift a frequency of an output signal of the multiplier to a higher-frequency side or to a lower-frequency side in the frequency shift circuit is selectable. In this situation, the frequency pull-in operation can become more rapid by predicting whether the target frequency is in the higher-frequency side or in the lower-frequency side, and shifting the frequency corresponding to the prediction result.

In addition, it is preferable that a frequency of an output signal of the multiplier is alternately shifted to a higher-frequency side and a lower-frequency side with a predetermined reference frequency being the center. In this situation, the frequency pull-in operation can become more rapid when the target frequency is close to the reference frequency.

In addition, it is preferable that a maximum value of a frequency shift range in the frequency shift circuit is variable. In this situation, shifting of the frequency to an adjacent channel can be prevented.

In addition, it is preferable that a low-pass filter to remove an unnecessary high-frequency component from an output signal of the multiplier is further provided. The phase pull-in circuit controls the oscillator to adjust a phase of an output signal of the low-pass filter to the predetermined target phase, and the frequency pull-in circuit controls the oscillator to adjust a frequency of an output signal of the low-pass filter to the predetermined target frequency. In this situation, the frequency difference can be detected with high accuracy.

In addition, it is preferable that a cutoff frequency of the low-pass filter is variable. In this situation, the cutoff frequency can be changed corresponding to the symbol rate of the high-frequency signal, and the frequency difference can be detected with further high accuracy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
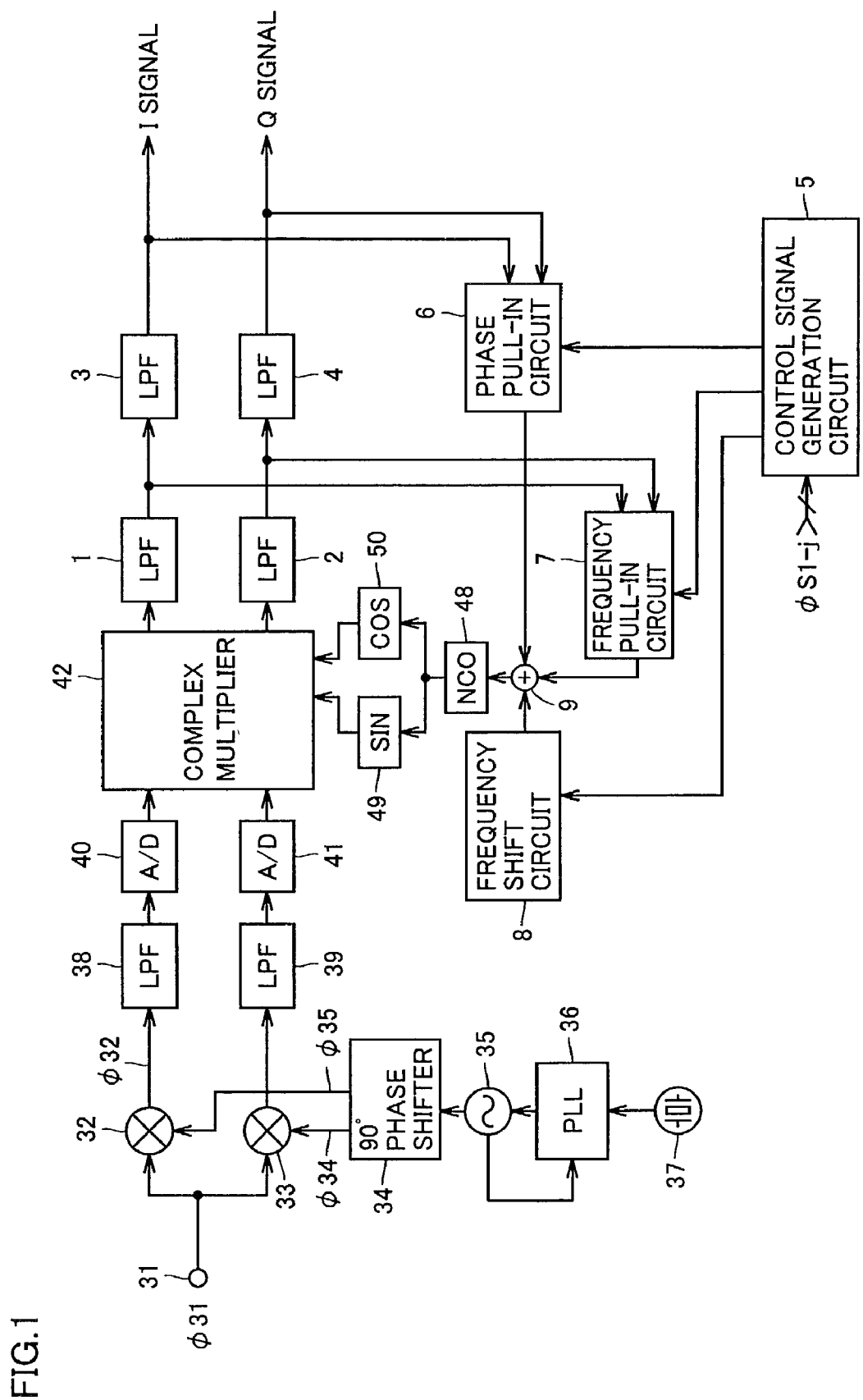
FIG. 1 is a circuit block diagram of a main portion of a high-frequency receiving apparatus according to one embodiment of the present invention.
Figure 12:
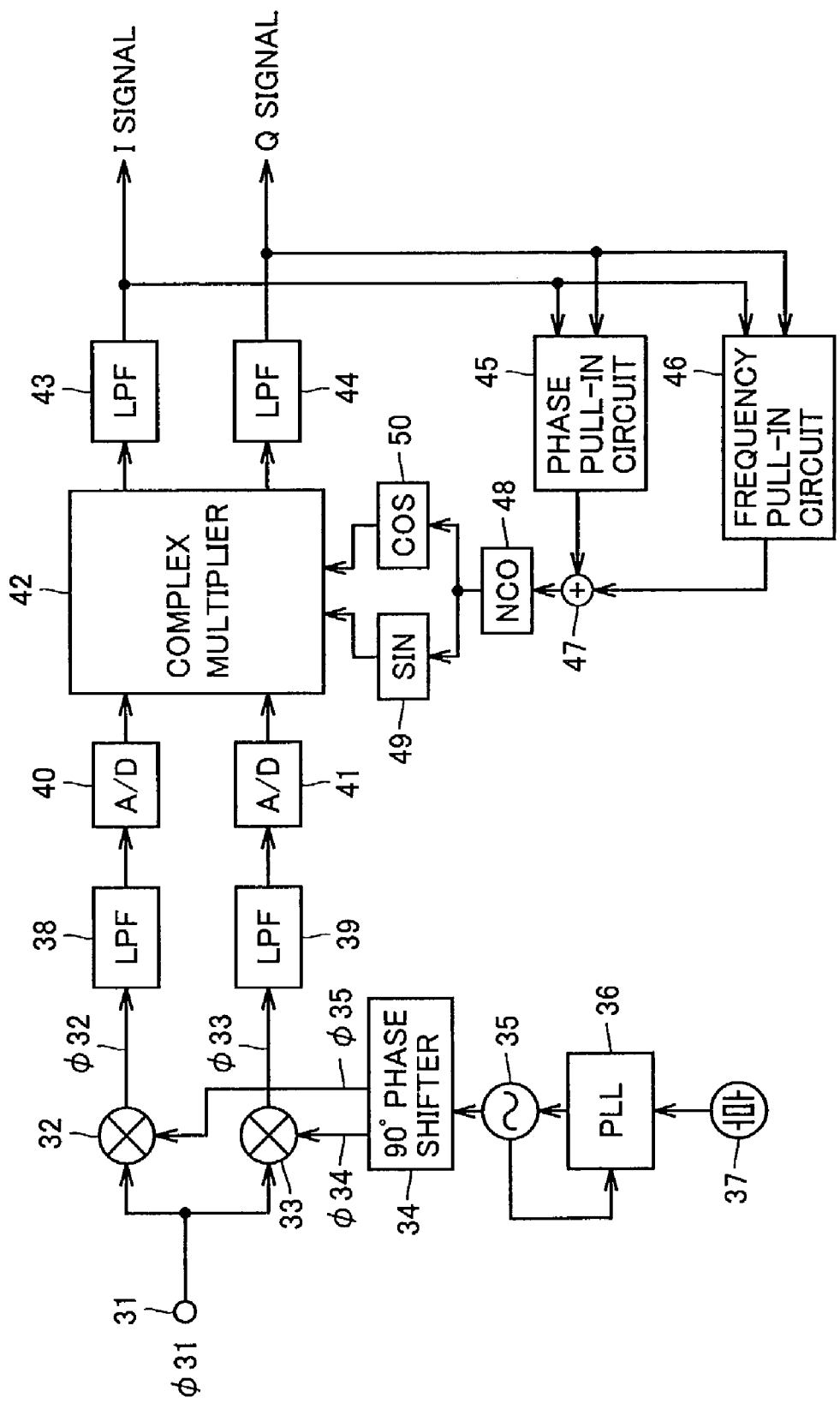
FIG. 12 is a circuit block diagram of a main portion of a conventional high-frequency receiving apparatus.

FIG. 1 is a circuit block diagram of a main portion of a high-frequency receiving apparatus according to one embodiment of the present invention, which diagram is contrasted with FIG. 12.

Referring to FIG. 1, this high-frequency receiving apparatus differs from the high-frequency receiving apparatus shown in FIG. 12 in that, digital low-pass filters 43, 44, phase pull-in circuit 45, frequency pull-in circuit 46, and adder 47 are replaced with digital low-pass filters 1-4, a control signal generation circuit 5, a phase pull-in circuit 6, a frequency pull-in circuit 7, a frequency shift circuit 8, and an adder 9.

Digital low-pass filters 1, 2 are common digital low-pass filters without roll-off properties, and digital low-pass filters 3, 4 are digital low-pass filters having roll-off properties. I signal generated at complex multiplier 42 is transferred to a subsequent circuit via digital low-pass filters 1, 3, while Q signal generated at complex multiplier 42 is transferred to a subsequent circuit via digital low-pass filters 2, 4. Control signal generation circuit 5 controls phase pull-in circuit 6, frequency pull-in circuit 7 and frequency shift circuit 8 according to external selection signals φ S1-φ Sj (j is a natural number).

Figure 2:
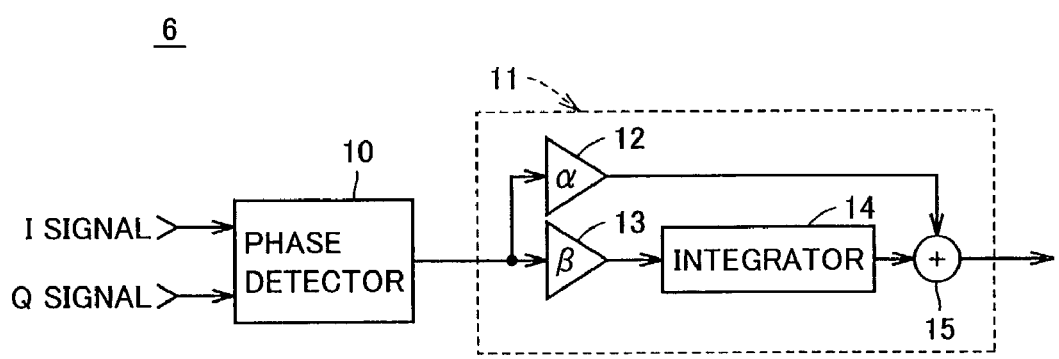
FIG. 2 is a circuit block diagram of a configuration of a phase pull-in circuit shown in FIG. 1.

Output signals of digital low-pass filters 3, 4 are fed to phase pull-in circuit 6 to perform a phase pull-in operation with high accuracy using the signals after removing unnecessary frequency components. As shown in FIG. 2, phase pull-in circuit 6 includes a phase detector 10 and a loop filter 11, and loop filter 11 includes amplifiers 12, 13, an integrator 14 and an adder 15. Phase detector 10 detects phase differences between I signal and Q signal passed through digital low-pass filters 3, 4 and respective ideal points of I signal and Q signal, and outputs a signal having a level corresponding to the detected phase differences. An output signal of phase detector 10 is smoothed with loop filter 11, and is fed to a control terminal of numerically controlled oscillator 48 via adder 9. An oscillation frequency of numerically controlled oscillator 48 increases or decreases corresponding to the level of the signal fed via adder 9.

Therefore, a first feedback loop is formed with complex multiplier 42, digital low-pass filters 1-4, phase pull-in circuit 6, adder 9, numerically controlled oscillator 48, and data converters 49, 50, and the oscillation frequency of numerically controlled oscillator 48 is controlled such that the phase difference becomes zero.

Figure 3:
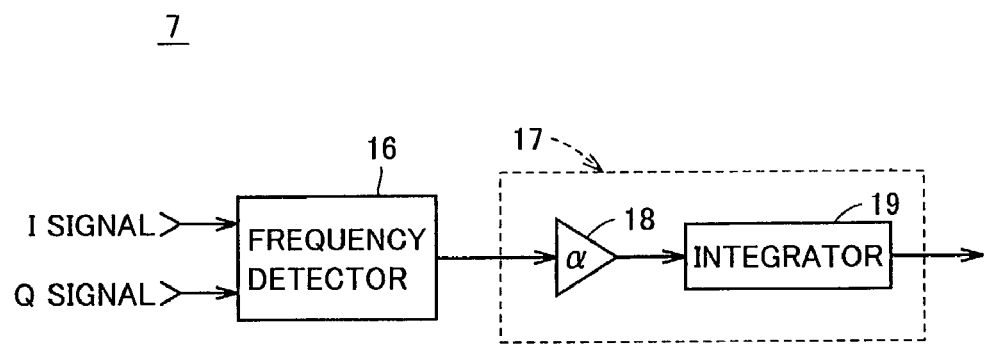
FIG. 3 is a circuit block diagram of a configuration of a frequency pull-in circuit shown in FIG. 1.

Output signals of digital low-pass filters 1, 2 are fed to frequency pull-in circuit 7. Output signals of digital low-pass filters 1, 2, which do not have roll-off properties, are fed to frequency pull-in circuit 7 to ensure a wider frequency pull-in range. As shown in FIG. 3, frequency pull-in circuit 7 includes a frequency detector 16 and a loop filter 17, and loop filter 17 includes an amplifier 18 and an integrator 19. Frequency detector 16 detects phase differences between I signal and Q signal passed through digital low-pass filters 1, 2 and respective ideal points of I signal and Q signal, and also detects amplitudes of I signal and Q signal, and further detects frequency differences based on the detection results and outputs a signal having a level corresponding to the detected frequency differences. An output signal of frequency detector 16 is smoothed with loop filter 17, and is fed to a control terminal of numerically controlled oscillator 48 via adder 9. An oscillation frequency of numerically controlled oscillator 48 increases or decreases corresponding to the level of the signal fed via adder 9.

Therefore, a second feedback loop is formed with complex multiplier 42, digital low-pass filters 1, 2, frequency pull-in circuit 7, adder 9, numerically controlled oscillator 48, and data converters 49, 50, and the oscillation frequency of numerically controlled oscillator 48 is controlled such that the frequency difference becomes zero.

Above-described first and second feedback loops do not operate concurrently. Basically, the frequency difference is first eliminated by frequency pull-in circuit 7, and then the phase difference is eliminated by phase pull-in circuit 6. Therefore, if the frequency could not be pulled by frequency pull-in circuit 7, the phase pull-in operation cannot be performed either, and the carrier cannot be regenerated. Thus, in this high-frequency receiving apparatus, frequency shift circuit 8 is provided to shift the oscillation frequency of numerically controlled oscillator 48 in a wider range, assuming the situation wherein the frequency cannot be pulled by frequency pull-in circuit 7.

Figure 4:
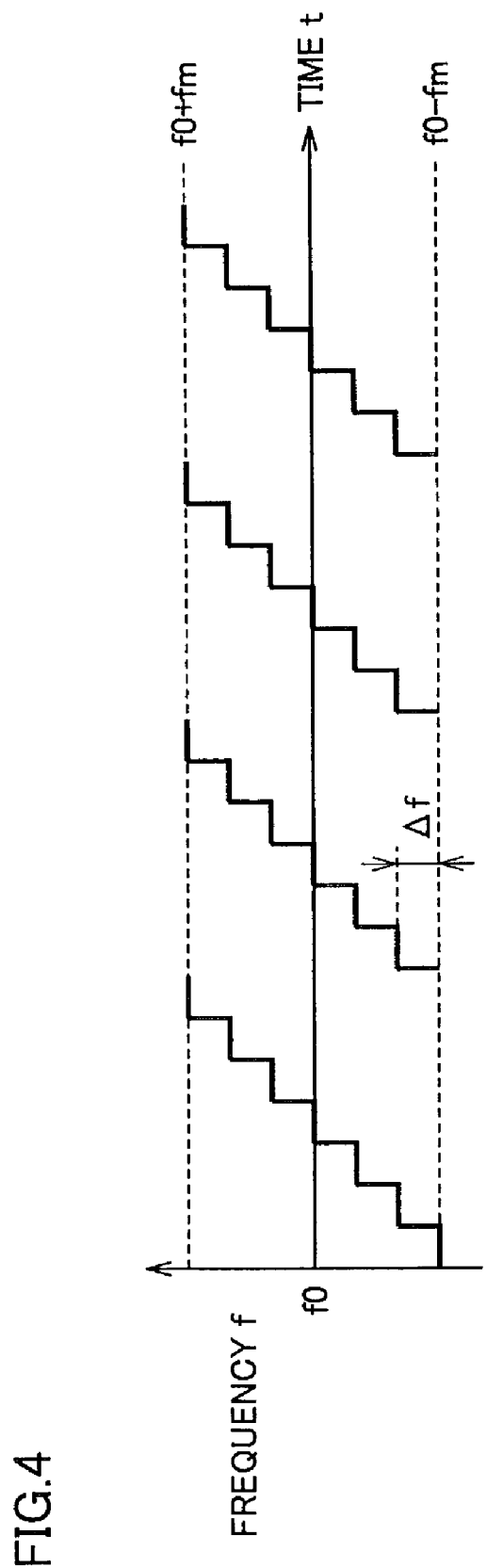
FIG. 4 is a time chart showing an example of a frequency shift method in the high-frequency receiving apparatus shown in FIG. 1.

FIG. 4 is a time chart showing an example of a frequency shift method. In FIG. 4, f0 represents a reference frequency, Δf represents a unit shift amount, and fm represents a maximum value of a shift amount. In this frequency shift method, an oscillation frequency f of numerically controlled oscillator 48 is increased from a lower limit f0−fm to an upper limit f0+fm of the shift range with a unit shift amount Δf for every prescribed time period. The frequency shift ends when the frequency is pulled. When frequency f reaches upper limit f0+fm, then frequency f is shifted to lower limit f0−fm at the next step, and is again increased with a unit shift amount Δf for every prescribed time period.

Figure 5:
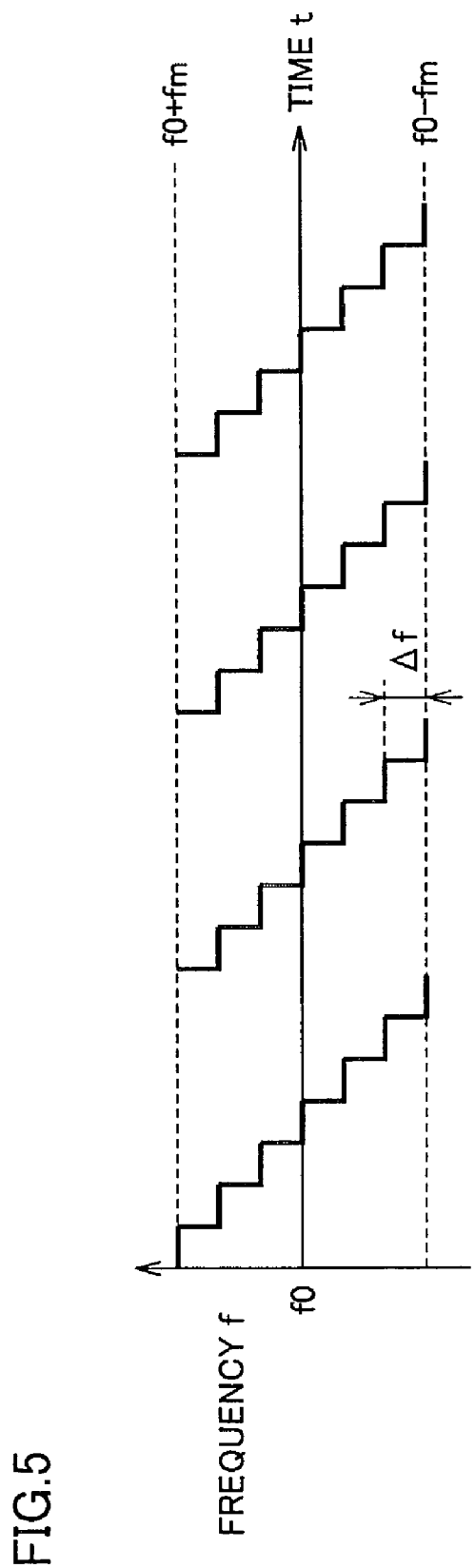
FIG. 5 is a time chart showing another example of the frequency shift method in the high-frequency receiving apparatus shown in FIG. 1.

FIG. 5 is a time chart showing another example of the frequency shift method. In this frequency shift method, oscillation frequency f of numerically controlled oscillator 48 is decreased from upper limit f0+fm to lower limit f0−fm of the shift range with a unit shift amount Δf for every prescribed time period. When frequency f reaches lower limit f0−fm, then frequency f is shifted to upper limit f0+fm at the next step. One of the methods shown in FIGS. 4 and 5 may be selected corresponding to a result of a prediction determining whether the target frequency is in a plus-side or in a minus-side of reference frequency f0. With this, the frequency pull-in operation can be performed more rapidly.

Figure 6:
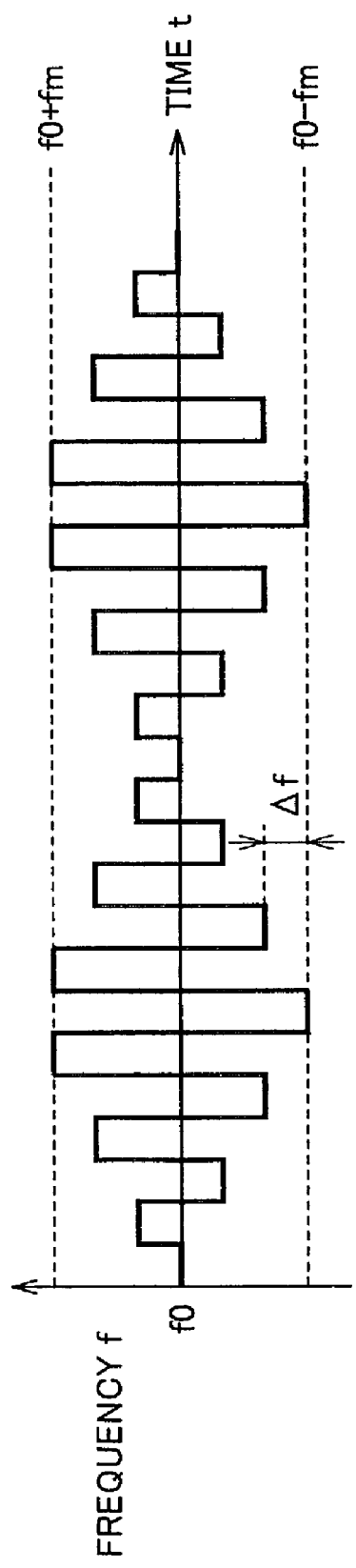
FIG. 6 is a time chart showing a further example of the frequency shift method in the high-frequency receiving apparatus shown in FIG. 1.

FIG. 6 is a time chart showing a further example of the frequency shift method. In this frequency shift method, frequency f is alternately increased/decreased from reference frequency f0 with a unit shift amount Δf for every prescribed time period. When frequency f reaches upper limit f0+ fm/lower limit f0−fm, then frequency f is alternately decreased/increased with a unit shift amount Δf for every prescribed time period. With this, the frequency pull-in operation can be performed more rapidly when the target frequency is close to reference frequency f0.

Maximum value fm of the shift amount of frequency f can be set from the outside with external selection signal φS1. With this, the shift range of frequency f can be prevented from reaching an adjacent channel. In addition, unit shift amount Δf can also be changed from the outside with an external selection signal φS2. With this, the frequency pull-in operation can be performed with high efficiency.

A plurality (five, for example) of algorithms are stored in control signal generation circuit 5. Control signal generation circuit 5 selects any of the plurality of algorithms according to an external selection signal φS3, and controls phase pull-in circuit 6, frequency pull-in circuit 7 and frequency shift circuit 8 according to the algorithm.

Figure 7:
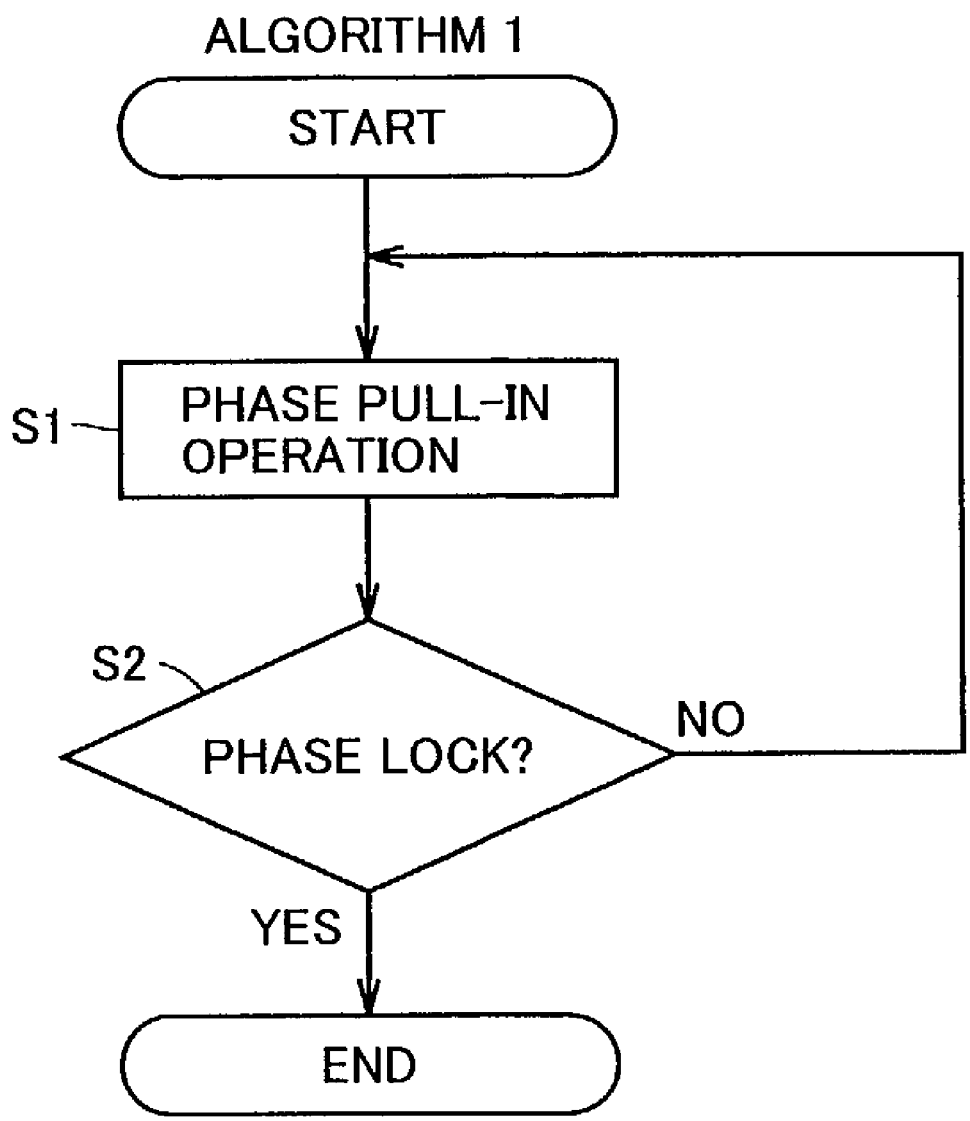
FIG. 7 is a flow chart showing an algorithm 1 stored in a control signal generation circuit shown in FIG. 1.

When the symbol rate is relatively high, such as equal to or higher than several tens of Mbaud, then an algorithm 1 shown in FIG. 7 is selected because relatively wide frequency range can be pulled only with the phase pull-in. In this algorithm 1, the phase pull-in operation is performed at step S1, and a determination is made as to whether a phase lock is detected or not, that is, whether the phase difference becomes zero, at step S2. The phase pull-in operation is ended if the phase lock is detected at step S2, and the operation returns to step S1 if the phase lock is not detected.

Figure 8:
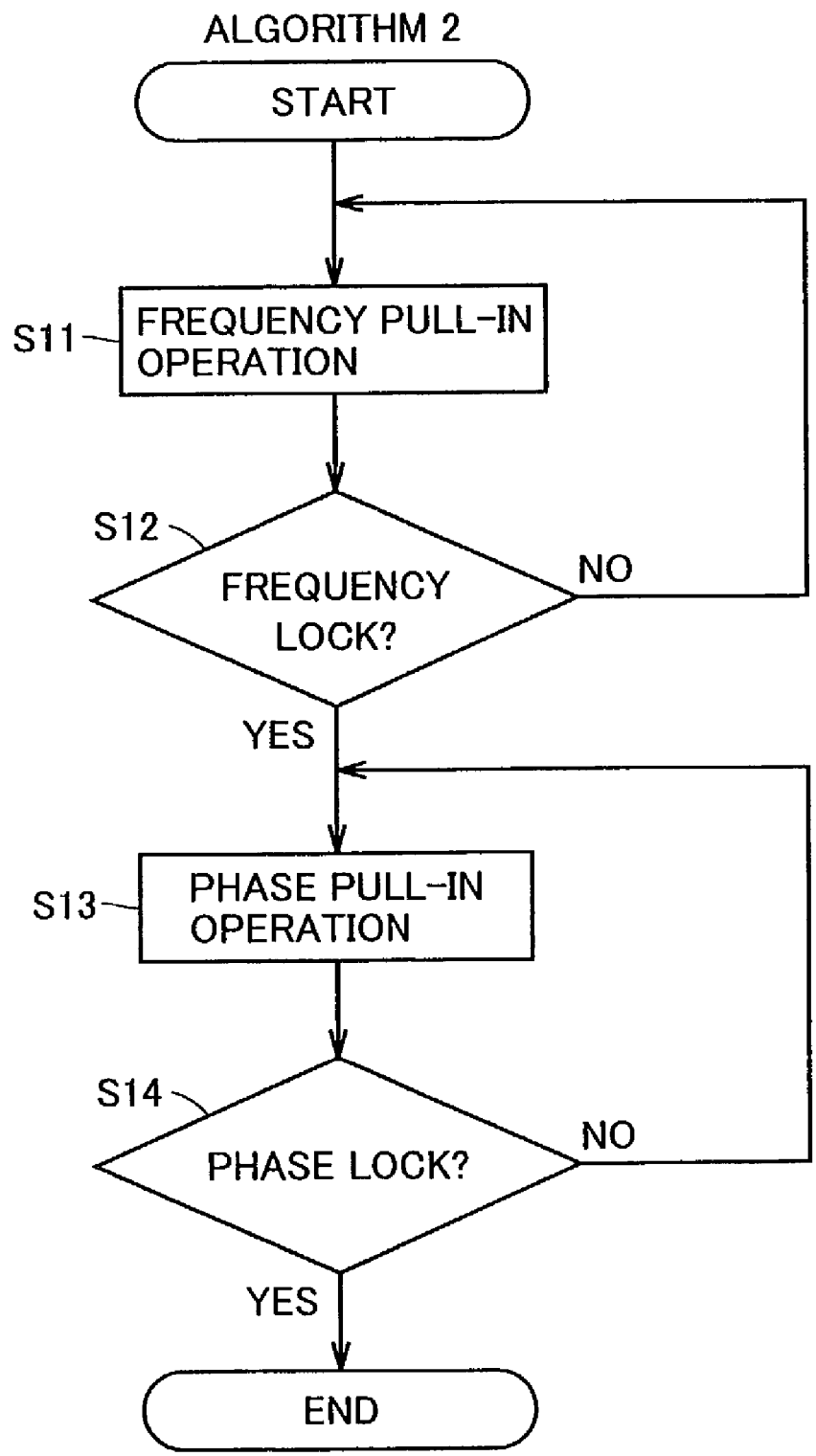
FIG. 8 is a flow chart showing another algorithm 2 stored in the control signal generation circuit shown in FIG. 1.

When the symbol rate is intermediate, such as between a few Mbaud and several tens of Mbaud, then an algorithm 2 shown in FIG. 8 is selected, because the generated frequency difference may be so large that the carrier regeneration is impossible only with the phase pull-in operation. In this algorithm 2, the frequency pull-in operation is performed at step S11, and a determination is made as to whether a frequency lock is detected or not, that is, whether the frequency difference becomes zero, at step S12. The operation proceeds to the next step S13 if the frequency lock is detected at step S12, and the operation returns to step S11 if the frequency lock is not detected. The phase pull-in operation is performed at step S13, and a determination is made as to whether a phase lock is detected or not, that is, whether the phase difference becomes zero, at step S14. The phase pull-in operation is ended if the phase lock is detected at step S14, and the operation returns to step S13 if the phase lock is not detected.

Figure 9:
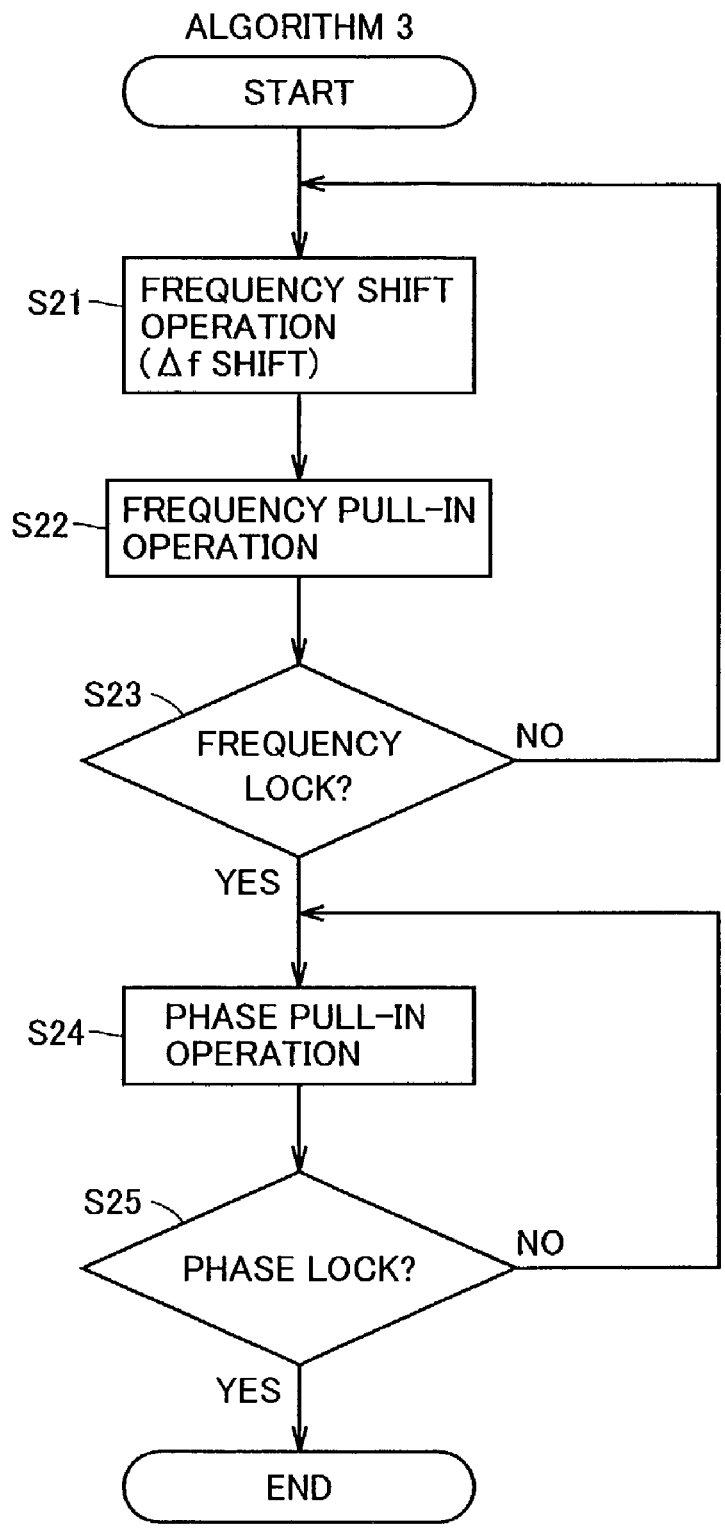
FIG. 9 is a flow chart showing a further algorithm 3 stored in the control signal generation circuit shown in FIG. 1.

When the symbol rate is low, such as one to several Mbaud, then an algorithm 3 shown in FIG. 9 is selected because the sufficient frequency pull-in range cannot be ensured only with the frequency pull-in operation and phase pull-in operation. In this algorithm 3, oscillation frequency f of numerically controlled oscillator 48 is shifted by a unit shift amount Δf as a frequency shift operation at step S21. The frequency pull-in operation is then performed at step S22, and a determination is made as to whether a frequency lock is detected or not, that is, whether the frequency difference becomes zero, at step S23. The operation proceeds to the next step S24 if the frequency lock is detected at step S23, and the operation returns to step S21 if the frequency lock is not detected.

The phase pull-in operation is performed at step S24, and a determination is made as to whether a phase lock is detected or not, that is, whether the phase difference becomes zero, at step S25. The phase pull-in operation is ended if the phase lock is detected at step S25, and the operation returns to step S24 if the phase lock is not detected.

An algorithm which is selected regardless of the level of the symbol rate is also stored in control signal generation circuit 5. In an algorithm 4 shown in FIG. 10, the frequency pull-in operation is performed at step S31, and the phase pull-in operation is performed at step S32 regardless of the presence or absence of the detection of the frequency lock. A determination is made as to whether a phase lock is detected or not, that is, whether the phase difference becomes zero, at step S33. The phase pull-in operation is ended if the phase lock is detected at step S33. If the phase lock is not detected, the frequency is shifted by a unit shift amount $\Delta f$ as the frequency shift operation at step S34, and then the operation returns to step S31. With this algorithm 4, less pull-in operation is necessary when the frequency difference is relatively small, and the carrier regeneration can rapidly be performed. When the frequency difference is larger, the carrier regeneration can be performed with the frequency shift operation (S34).

Figure 10:
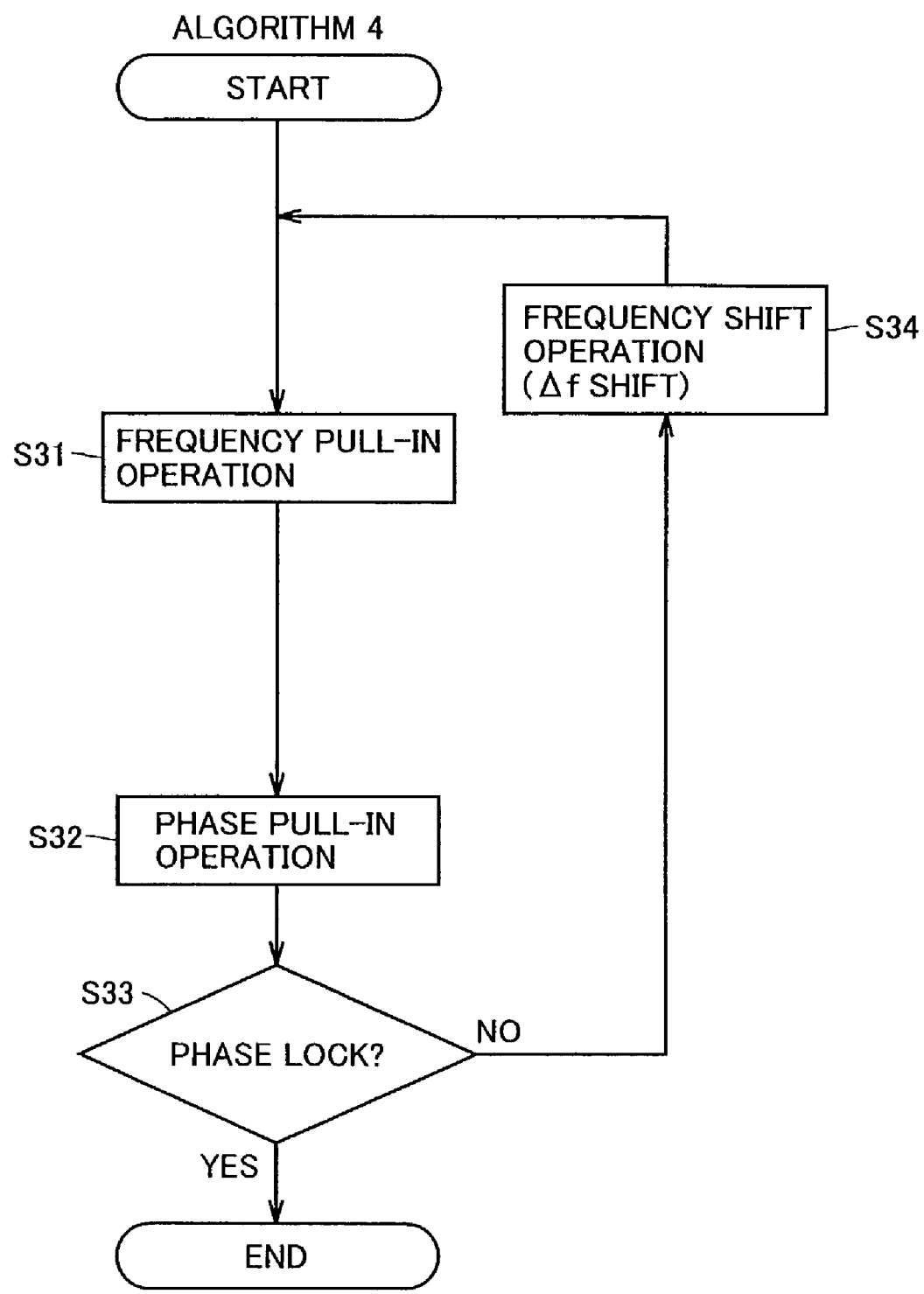
FIG. 10 is a flow chart showing a further algorithm 4 stored in the control signal generation circuit shown in FIG. 1.
Figure 11:
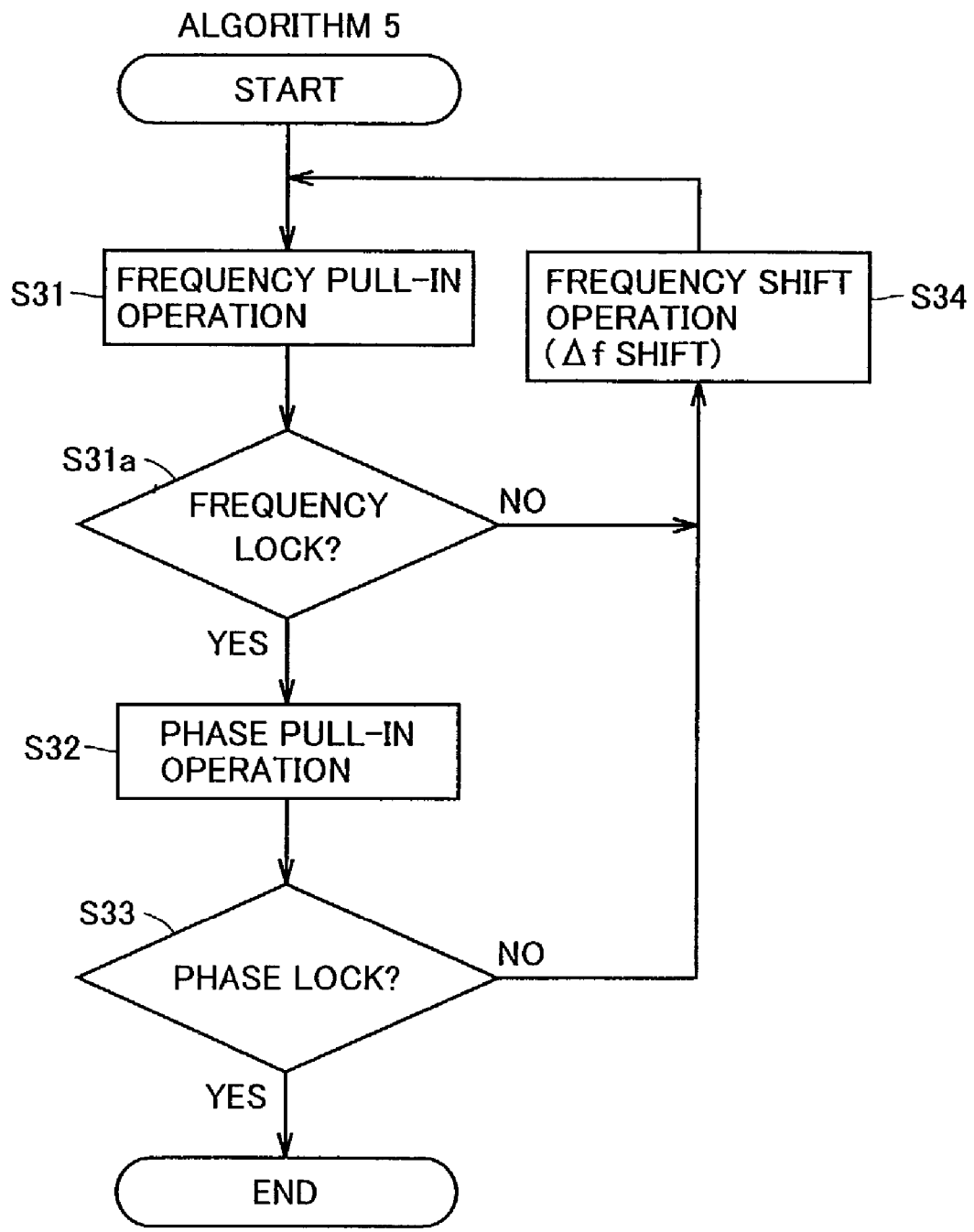
FIG. 11 is a flow chart showing a further algorithm 5 stored in the control signal generation circuit shown in FIG. 1.

In an algorithm 5 shown in FIG. 11, step 31a is interposed between steps S31 and S32 of algorithm 4 shown in FIG. 10. At step 31a, a determination is made as to whether a frequency lock is detected or not, that is, whether the frequency difference becomes zero. The frequency pull-in operation is ended and the operation proceeds to step S32 if the frequency lock is detected at step S31a, and the operation proceeds to step S34 if the frequency lock is not detected.

Low-pass filters 1, 2 may be provided if the presence of unnecessary frequency components in the output signal of complex multiplier 42 is known, and are not always necessary.

In addition, cutoff frequencies of low-pass filters 1, 2 can be made variable corresponding to a range of the frequency pull-in or a symbol rate. It may be configured such that, for example, cutoff frequencies of low-pass filters 1, 2 are set by control signal generation circuit 5 according to an external selection signal S4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high-frequency receiving apparatus receiving and demodulating a high-frequency signal modulated to a digital signal, comprising:
    an analog-digital converter converting an analog signal as a received signal to a digital signal;
    an oscillator having a controllable oscillation frequency and outputting a carrier regeneration signal;
    a multiplier multiplying a digital signal generated by said analog-digital converter and a carrier regeneration signal generated by said oscillator;
    a phase pull-in circuit controlling said oscillator to adjust a phase of an output signal of said multiplier to a predetermined target phase;
    a frequency pull-in circuit controlling said oscillator to adjust a frequency of an output signal of said multiplier to a predetermined target frequency;
    a frequency shift circuit controlling said oscillator to make a frequency of an output signal of said multiplier shift by a predetermined frequency; and
    a control circuit controlling said phase pull-in circuit, said frequency pull-in circuit and said frequency shift circuit, wherein
    said control circuit has
    a plurality of algorithms to pull a phase and a frequency of an output signal of said multiplier into said target phase and said target frequency respectively, and
    controls said phase pull-in circuit, said frequency pull-in circuit and said frequency shift circuit according to an algorithm selected from said plurality of algorithms.

2. The high-frequency receiving apparatus according to claim 1, wherein
    said predetermined frequency in said frequency shift circuit is variable.

3. A high-frequency receiving apparatus receiving and demodulating a high-frequency signal modulated to a digital signal, comprising:
    an analog-digital converter converting an analog signal as a received signal to a digital signal;
    an oscillator having a controllable oscillation frequency and outputting a carrier regeneration signal;
    a multiplier multiplying a digital signal generated by said analog-digital converter and a carrier regeneration signal generated by said oscillator;
    a phase pull-in circuit controlling said oscillator to adjust a phase of an output signal of said multiplier to a predetermined target phase;
    a frequency pull-in circuit controlling said oscillator to adjust a frequency of an output signal of said multiplier to a predetermined target frequency;
    a frequency shift circuit controlling said oscillator to make a frequency of an output signal of said multiplier shift by a predetermined frequency; and
    a control circuit controlling said phase pull-in circuit, said frequency pull-in circuit and said frequency shift circuit, wherein
    whether to shift a frequency of an output signal of said multiplier to a higher-frequency side or to a lower-frequency side in said frequency shift circuit is selectable, and
    a frequency of an output signal of said multiplier is alternately shifted to a higher-frequency side and a lower-frequency side with a predetermined reference frequency being the center.

4. The high-frequency receiving apparatus according to claim 1, wherein
    a maximum value of a frequency shift range in said frequency shift circuit is variable.

5. A high-frequency receiving apparatus receiving and demodulating a high-frequency signal modulated to a digital signal, comprising:
    an analog-digital converter converting an analog signal as a received signal to a digital signal;
    an oscillator having a controllable oscillation frequency and outputting a carrier regeneration signal;
    a multiplier multiplying a digital signal generated by said analog-digital converter and a carrier regeneration signal generated by said oscillator;
    a phase pull-in circuit controlling said oscillator to adjust a phase of an output signal of said multiplier to a predetermined target phase;
    a frequency pull-in circuit controlling said oscillator to adjust a frequency of an output signal of said multiplier to a predetermined target frequency;
    a frequency shift circuit controlling said oscillator to make a frequency of an output signal of said multiplier shift by a predetermined frequency;

a control circuit controlling said phase pull-in circuit, said frequency pull-in circuit and said frequency shift circuit; and a low-pass filter to remove an unnecessary high-frequency component from an output signal of said multiplier, wherein said phase pull-in circuit controls said oscillator to adjust a phase of an output signal of said low-pass filter to said predetermined target phase, and said frequency pull-in circuit controls said oscillator to adjust a frequency of an output signal of said low-pass filter to said predetermined target frequency.

6. The high-frequency receiving apparatus according to claim 5, wherein a cutoff frequency of said low-pass filter is variable.

7. A high-frequency receiving apparatus receiving and demodulating a high-frequency signal modulated to a digital signal, comprising:

an analog-digital converter converting an analog signal as a received signal to a digital signal;

an oscillator having a controllable oscillation frequency and outputting a carrier regeneration signal;

a multiplier multiplying a digital signal generated by said analog-digital converter and a carrier regeneration signal generated by said oscillator;

a phase pull-in circuit controlling said oscillator to adjust a phase of an output signal of said multiplier to a predetermined target phase;

a frequency pull-in circuit controlling said oscillator to adjust a frequency of an output signal of said multiplier to a predetermined target frequency;

a frequency shift circuit controlling said oscillator to make a frequency of an output signal of said multiplier shift by a predetermined frequency; and a control circuit controlling said phase pull-in circuit, said frequency pull-in circuit and said frequency shift circuit, wherein said control circuit (i) has a plurality of algorithms to pull a phase and a frequency of an output signal of said multiplier into said target phase and said target frequency respectively, and (ii) controls said phase pull-in circuit, said frequency pull-in circuit and said frequency shift circuit according to an algorithm selected from said plurality of algorithms, and whether to shift a frequency of an output signal of said multiplier to a higher-frequency side or to a lower-frequency side in said frequency shift circuit is selectable.

* * * * *